United States Patent
Bonhote et al.

(10) Patent No.: US 8,048,281 B2
(45) Date of Patent: Nov. 1, 2011

(54) METHOD FOR PRODUCING TIGHT PITCHED COIL WITH REDUCED PROCESSING STEPS

(75) Inventors: Christian Rene Bonhote, San Jose, CA (US); Quang Le, San Jose, CA (US); Ihavin Sinha, New Westminster (CA)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 617 days.

(21) Appl. No.: 12/286,993

(22) Filed: Oct. 2, 2008

(65) Prior Publication Data
US 2010/0084263 A1 Apr. 8, 2010

(51) Int. Cl.
*C25D 5/02* (2006.01)
*G11B 5/17* (2006.01)

(52) U.S. Cl. .................... 205/119; 360/123.01

(58) Field of Classification Search ............ 205/119; 29/603.25; 360/123.01
See application file for complete search history.

(56) References Cited

U.S. PATENT DOCUMENTS

| 6,004,473 A | 12/1999 | Hsiao et al. |
| 6,260,256 B1 | 7/2001 | Sasaki |
| 6,696,226 B1 | 2/2004 | Dinan et al. |
| 6,804,879 B2 | 10/2004 | Hsiao et al. |
| 7,228,619 B2 * | 6/2007 | Le .............................. 29/603.23 |
| 2002/0093762 A1 | 7/2002 | Hsiao et al. |
| 2006/0034012 A1 | 2/2006 | Lam et al. |
| 2008/0149490 A1 * | 6/2008 | Bonhote et al. ............... 205/183 |

* cited by examiner

*Primary Examiner* — Luan Van
(74) *Attorney, Agent, or Firm* — D'Arcy H. Lorimer; Lorimer Labs

(57) ABSTRACT

Methods for fabricating thin film magnetic head coil structures are disclosed. The methods disclose deposition of a first thick seed layer, followed by deposition of an ultra-thin second seed layer. Coil structures having sub-micron pitch and high aspect ratios are deposited on the second ultra-thin seed layer, which is removed from between the coil windings via an isotropic etch process such as wet etching or RIE. Subsequent to selective removal of the ultra-thin second seed layer, the first thick seed layer is utilized to deposit pole and back-gap structures, eliminating the need to deposit (and remove) a subsequent seed layer on the coil structure.

12 Claims, 13 Drawing Sheets

METHOD FOR PRODUCING TIGHT PITCHED COIL WITH REDUCED PROCESSING STEPS

BACKGROUND OF THE INVENTION

1. Field of the Invention

This invention relates to the fabrication of thin film magnetic head structures. Specifically, the invention relates to methods for fabricating tight pitched write coil structures that have fewer process steps than conventional coil fabrication processes.

2. Description of the Related Art

The increasing demand to shrink dimensions in the overall thin film head design has correspondingly fueled the challenge to find innovative techniques aimed at fabricating the critical head structures with lower process steps and higher yields. One area of focus in the thin film head design is write coil fabrication. A conventional method to fabricate the write coil requires deposition of relatively thick a seed-layer followed by photo resist deposition, photo resist development, electroplating of the coil conductor, and seed-layer removal. As the coil pitch is scaled to sub-micron dimensions, while maintaining the coil's aspect ratio at or greater than 4:1, a major challenge is presented with respect to removing the seed-layer. Ion milling and sputter etching are two common methods usually employed to remove the seed-layer. As coil pitch shrinks, shadowing of the coil structure due to high aspect ratios prevents effective removal of the seed-layer during sputter etching or ion mill etching. Since the seed-layer is conductive, incomplete removal can result in coil shorting. Furthermore, conventional processing requires the blanket deposition of a second seed layer after the coil is formed to deposit pole layers and backgap structures. This second seed layer must also be removed by ion milling or sputter etching, resulting a second opportunity to short the coils due to incomplete seed removal. A Damascene approach can potentially be utilized as an alternative approach to the conventional method. The Damascene process requires that a conductive seed layer be deposited on the photo resist layer defining the coil after imaging and development. Obtaining uniform seed layer coverage with high aspect ratios and sub micron pitch dimensions is difficult. Gaps in seed layer surface coverage will result in voids and defects when the coil structure is plated. Even with good seed coverage, electroplating high aspect ratio, sub micron channels is difficult because deposition on the vertical walls of the photo resist can choke off deposition from the base of the coil (bottom of the trench being filled), creating gaps and voids in the final plated structure.

An example prior art process is described in FIGS. 1-7 (Prior Art). FIG. 1 (Prior Art) is a partial cross section view 100 of a thin film head structure of the prior art containing shield layers 102 and 104, read head structure 103, lower return pole 106, and insulating layers 108a, 108b. This is the base structure upon which the coil structure is built.

FIG. 2 (Prior Art) is a partial cross section view 200 of the structure of FIG. 1 subsequent to the deposition of seed layer 202. Typically seed layer 202 is between 500 to 2000 angstroms in thickness.

FIG. 3 (Prior Art) is a partial cross section view 300 of the structure of FIG. 2 subsequent to the fabrication of coil structure 302 and center tap structure 304 on seed layer 202. Prior to depositing the coil structure 302 and center tap structure 304 by electroplating, a photo resist layer is deposited on seed layer 202, then imaged, and developed to define the coil (not shown). Subsequent to coil plating, the photo resist is removed (not shown). After construction of the coil structure 302, seed layer 202 must be removed completely to avoid short circuits in the coil.

FIG. 4 (Prior Art) is a partial cross section view 400 of the structure of FIG. 3 subsequent to ion milling to remove exposed portions of seed layer 202. Since ion milling is a "line of sight" etching process, shadowing of portions of seed layer 202 in the areas between adjacent coil segments can occur. This is particularly true as the coil pitch becomes smaller and the aspect ratio becomes greater. Increases in aspect ratio may occur because the thickness of coil structure may need to increase to provide acceptable coil conductivity, particularly as pitch decreases. The shadowing effects, combined with relatively thick (i.e. >500 angstroms) seed layers increase the probability of incomplete seed removal and coil shorts. However, reducing the seed thickness of seed layer 202 can compromise the coil electroplating process due high seed resistivity, particularly if electrical contact from the seed layer to the plating power source is at the perimeter of the wafer upon which the thin film heads are being fabricated. This apparent dilemma places an inherent limit on shrinking the coil footprint in the thin film head in this prior art process.

FIG. 5 (Prior Art) is a partial cross section view 500 of the structure of FIG. 4 subsequent to the deposition of second seed layer 502. Second seed layer 502 is required to deposit subsequent magnetic layers and structures. Seed layer 502 is deposited as a blanket layer, and as such is deposited in the areas between the coil windings.

FIG. 6 (Prior Art) is a partial cross section view 600 of the structure of FIG. 5 subsequent to the deposition of lower pole structure 602 and backgap structure 604 on second seed layer 502. Lower pole structure 602 may also be known as the pedestal. Prior to deposition of structures 602 and 604, a photo resist layer was deposited, imaged, and developed (not shown). The deposition of structures 602 an 604 is then carried out by electroplating using seed layer 502 as a cathode (not shown). Subsequent to plating, the photo resist layer is removed (not shown).

FIG. 7 (Prior Art) is a partial cross section view 700 of the structure of FIG. 6 subsequent to the subsequent to the removal of second seed layer 502. Ion milling is typically utilized to remove the seed layer, and the same issues regarding shadowing and incomplete seed layer removal are present in this process step as well. It is possible to prevent seed deposition on the fabricated coil 302 via deposition of a protective photo resist layer, for example. But this adds expensive process steps which are undesirable.

What is needed is an improved method for fabricating coils for thin film heads.

SUMMARY OF THE INVENTION

It is an object of the present invention to provide a method for fabricating a thin film magnetic head including depositing a first seed layer on a surface of a partially completed thin film head structure; removing a first portion of the first seed layer, exposing a portion of the surface; depositing a first portion of a second seed layer over a second portion of the first seed layer and a second portion of the second seed layer over the portion of the surface; depositing a photo resist layer over the second portion of the second seed layer; and, electroplating a coil structure over the second portion of the second seed layer by removing a portion of the photo resist layer and conducting electrical current from the second portion of the first seed layer to the second portion of the second seed layer, wherein the first seed layer is greater than 200 angstroms in thickness and the second seed layer is less than 70 angstroms in thickness.

It is another object of the present invention to provide a method for fabricating a thin film magnetic head including depositing a first seed layer on a surface of a partially completed thin film head structure; removing a first portion of the first seed layer, exposing a portion of the surface; depositing a first portion of a second seed layer over a second portion of the first seed layer and a second portion of the second seed layer over the portion of the surface; depositing a photo resist layer over the second portion of the second seed layer; electroplating a coil structure over the second portion of the second seed layer by removing a portion of the photo resist layer and conducting electrical current from the second portion of the first seed layer to the second portion of the second seed layer, wherein the first seed layer is greater than 200 angstroms in thickness and the second seed layer is less than 70 angstroms in thickness; removing remaining portions of said photo resist layer subsequent to electroplating the coil structure; removing exposed portions of the second seed layer subsequent to removing the remaining portions of the photo resist layer; and, electroplating a lower pole pedestal structure and a backgap structure on a lower return pole layer subsequent to removing the exposed portions of the second seed layer, by conducting electrical current from a remaining portion of the first seed layer to the lower return pole layer.

BRIEF DESCRIPTION OF THE DRAWINGS

The present invention will be better understood when consideration is given to the following detailed description thereof Such description makes reference to the annexed drawings, wherein.

DETAILED DESCRIPTION OF THE PREFERRED EMBODIMENTS

Figure 1:
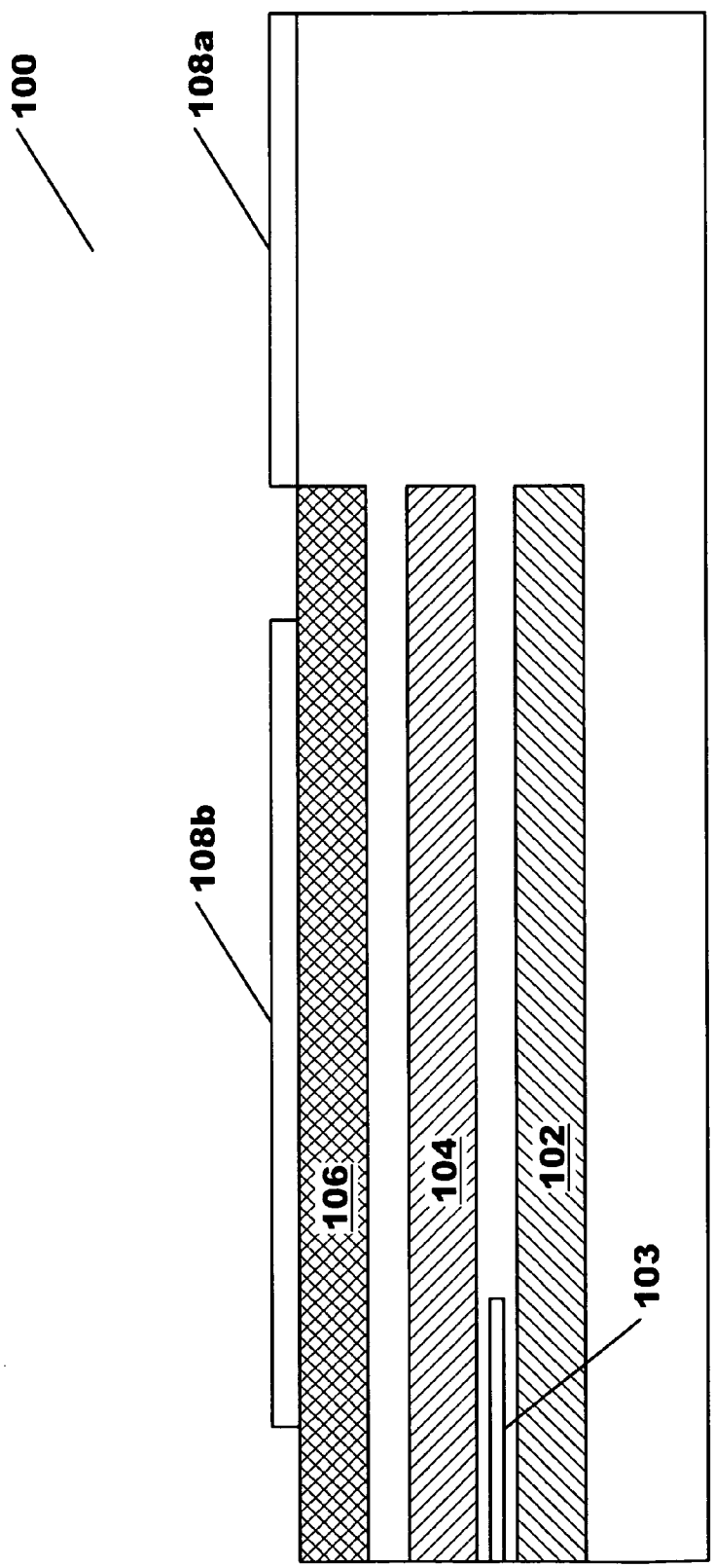
FIG. 1 (Prior Art) is a partial cross section view of a thin film head structure.
Figure 2:
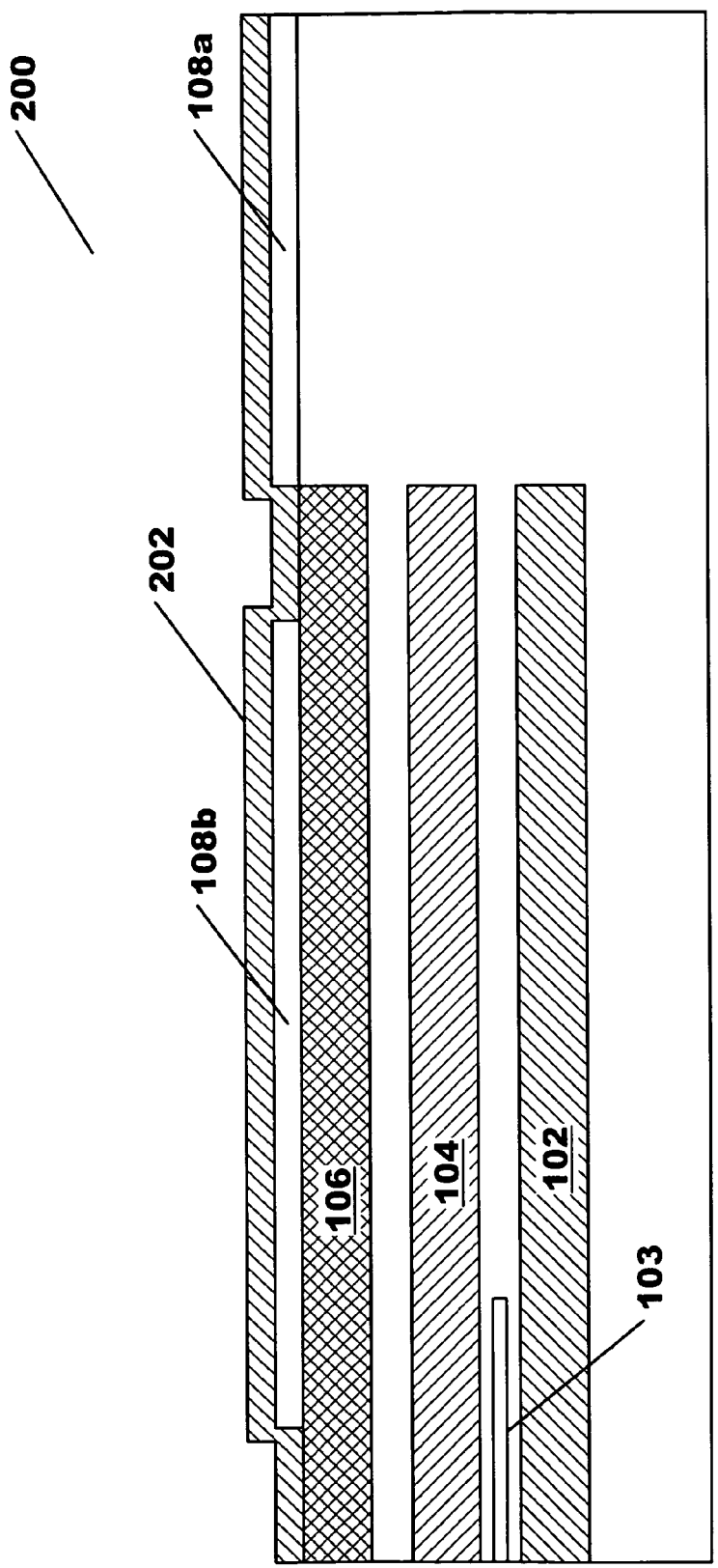
FIG. 2 (Prior Art) is a partial cross section view of the structure of FIG. 1 subsequent to the deposition of seed layer 202.
Figure 3:
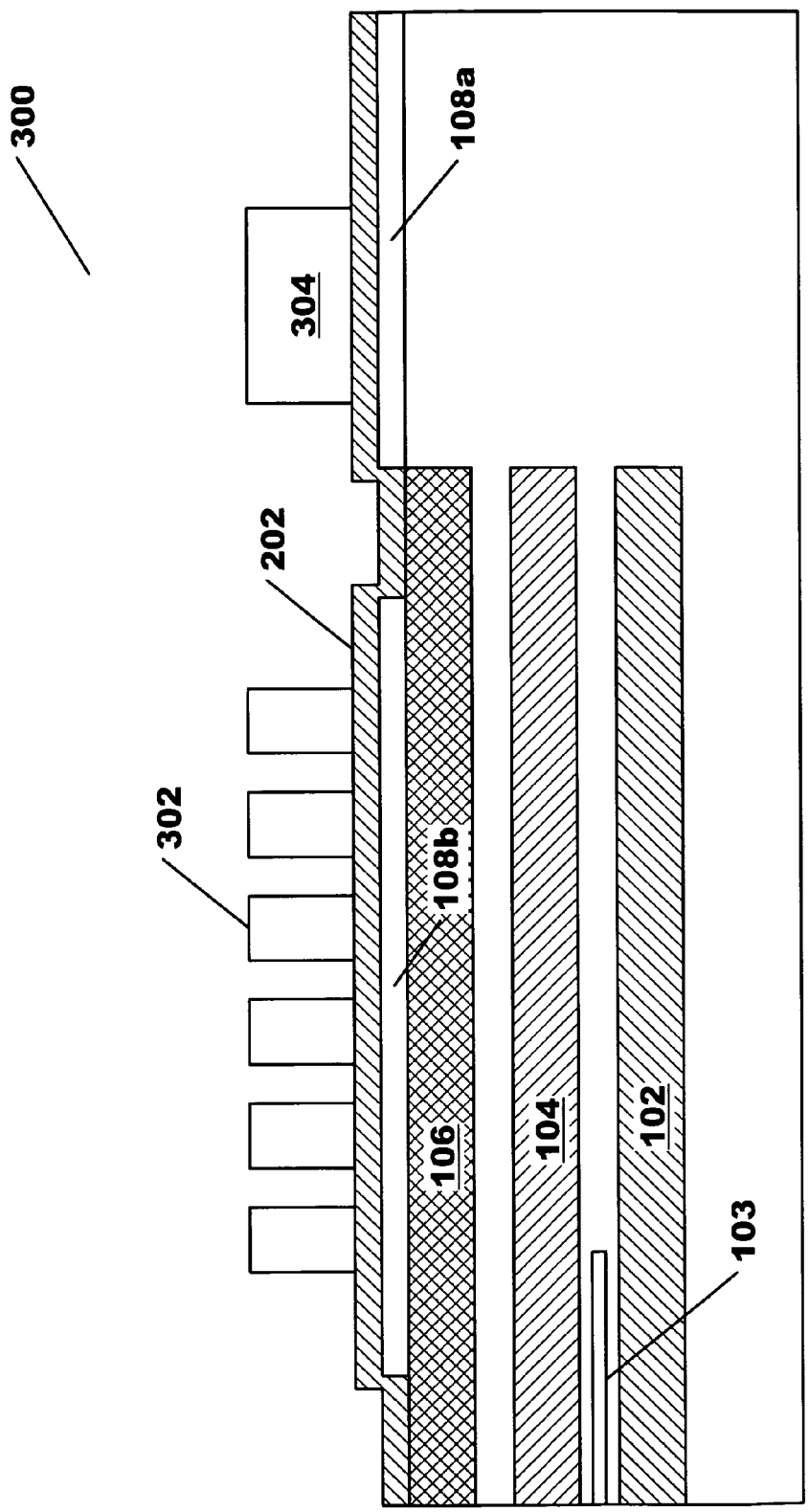
FIG. 3 (Prior Art) is a partial cross section view of the structure of FIG. 2 subsequent to the fabrication of coil structure 302 and center tap structure 304 on seed layer 202.
Figure 4:
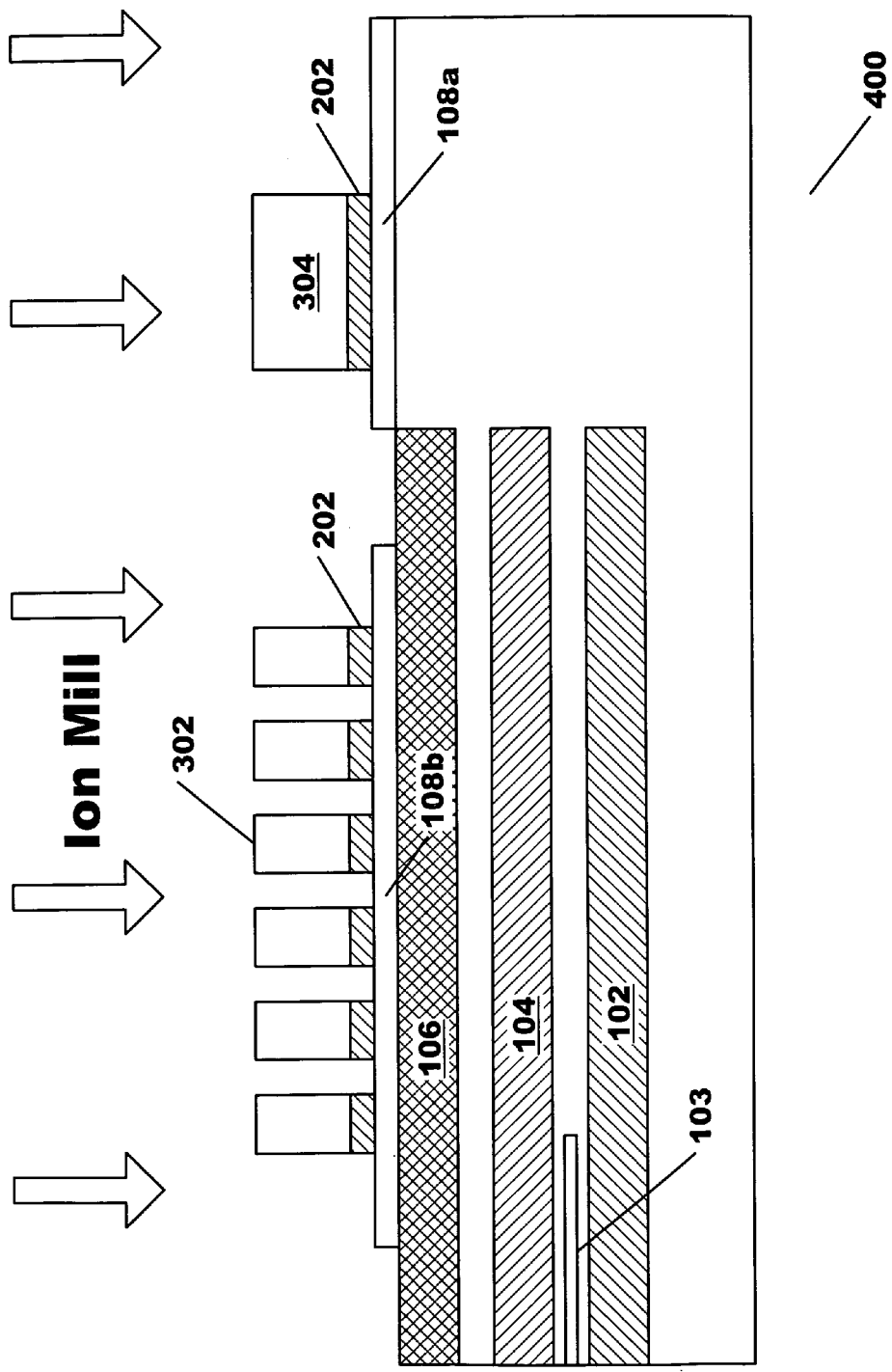
FIG. 4 (Prior Art) is a partial cross section view of the structure of FIG. 3 subsequent to ion milling to remove exposed portions of seed layer 202.
Figure 5:
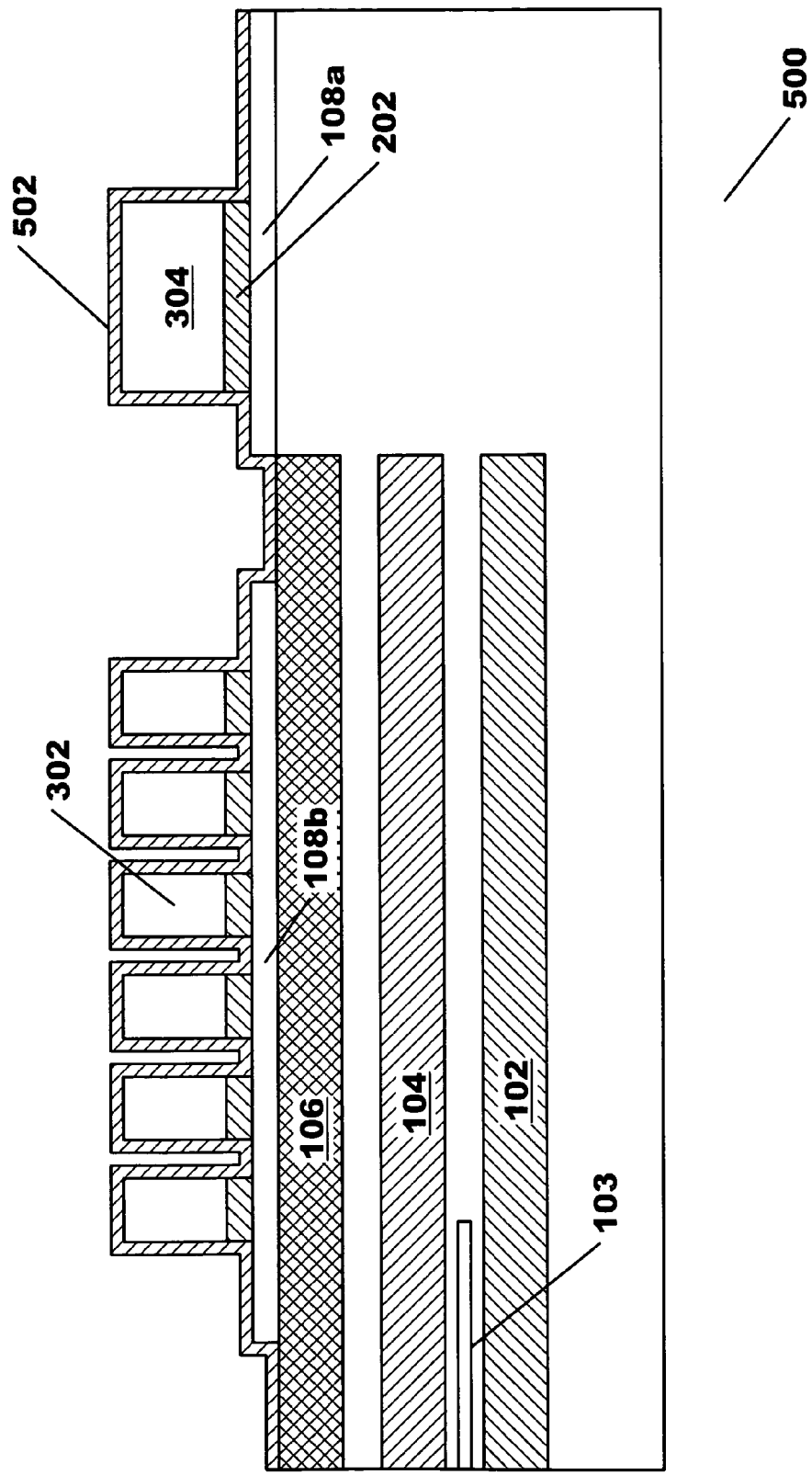
FIG. 5 (Prior Art) is a partial cross section view of the structure of FIG. 4 subsequent to the deposition of second seed layer 502.
Figure 6:
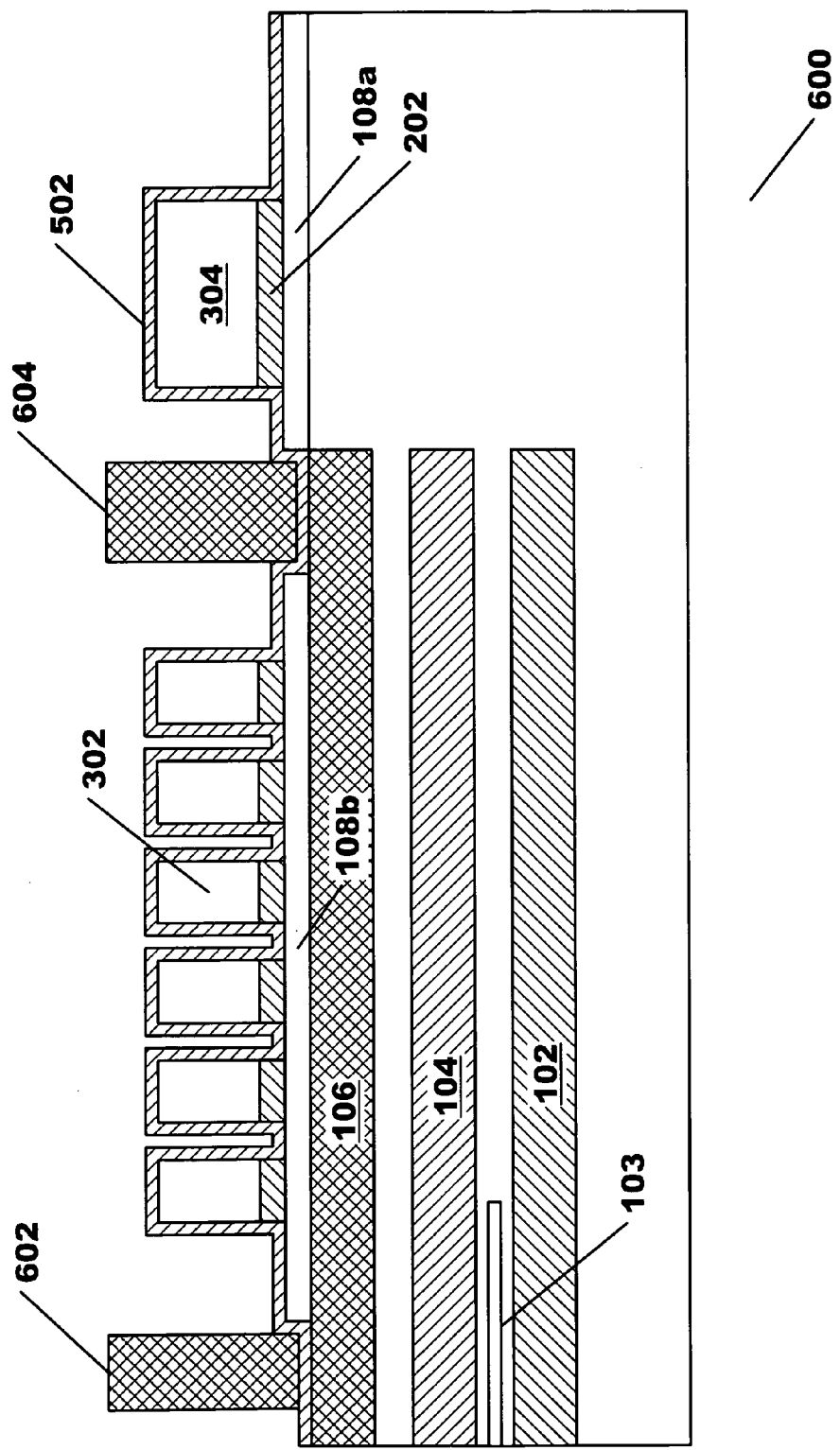
FIG. 6 (Prior Art) is a partial cross section view of the structure of FIG. 5 subsequent to the deposition of pole structure 602 and backgap structure 604 on second seed layer 502.
Figure 7:
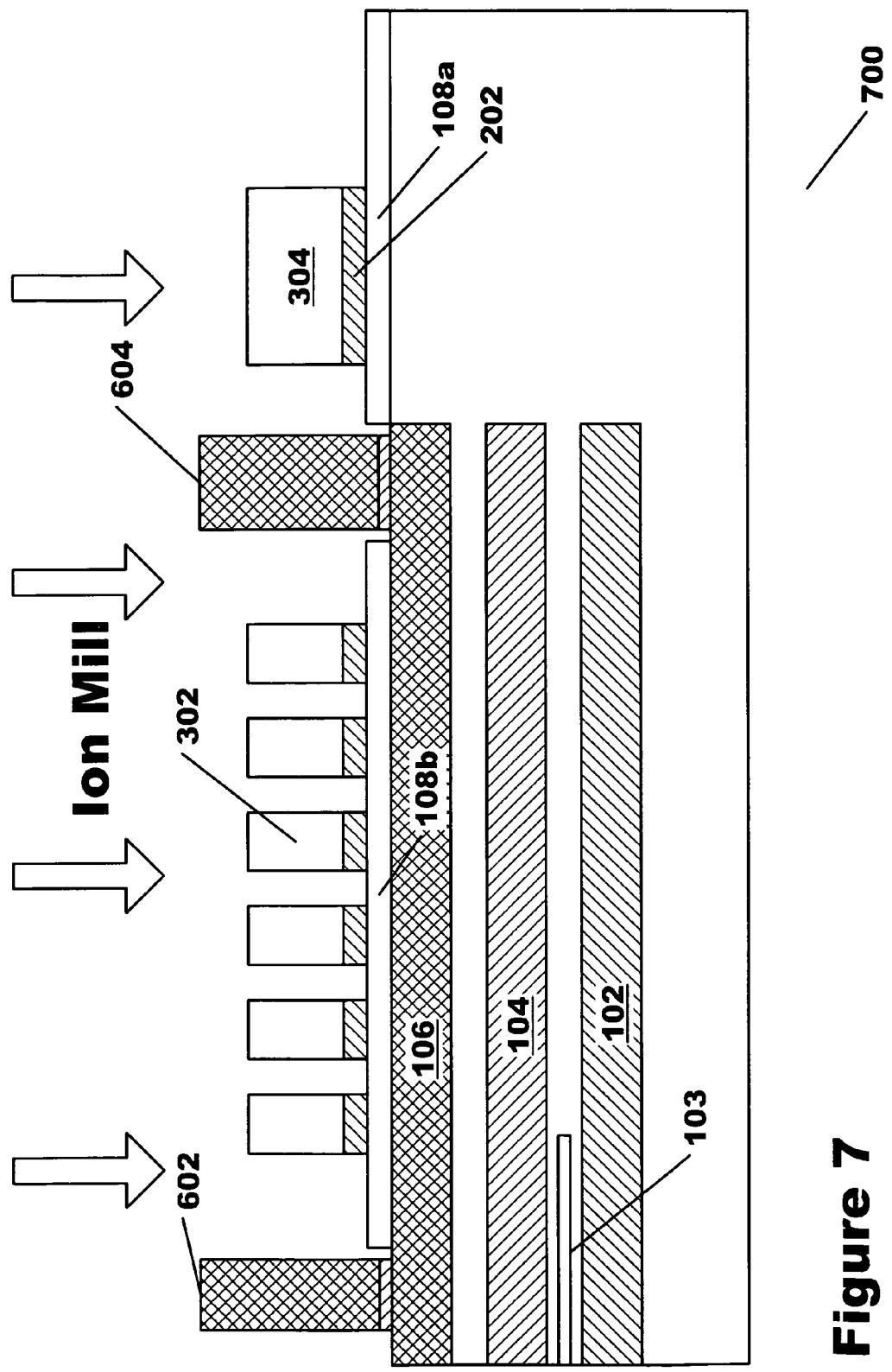
FIG. 7 (Prior Art) is a partial cross section view of the structure of FIG. 6 subsequent to the subsequent to the removal of second seed layer 502.

FIGS. 1-7 (Prior Art) have been discussed above. It is an object of the present invention to resolve a number of problems presented above in the prior art process illustrated in FIGS. 1-7. In particular, the present invention utilizes a dual seed layer structure having an ultra-thin second seed layer deposited over a thicker first seed layer to build the coil structures. The ultra-thin second seed layer can be constructed of a number of conductive materials which can be easily removed by wet etch, RIE, sputter etching, or ion milling. Due to the thickness of the ultra-thin second seed layer, removal can be achieved with non-line of sight etching processes, reducing the probability of coil shorting with high aspect ratio, sub micron pitch coil structures. An additional aspect of the present invention removes the requirement of a second seed deposition step as shown in FIG. 5 (Prior Art) to deposit pole pedestal and backgap structures. As such, the present invention reduces process steps and provides a simpler and cheaper process for fabricating thin film magnetic heads.

Figure 8:
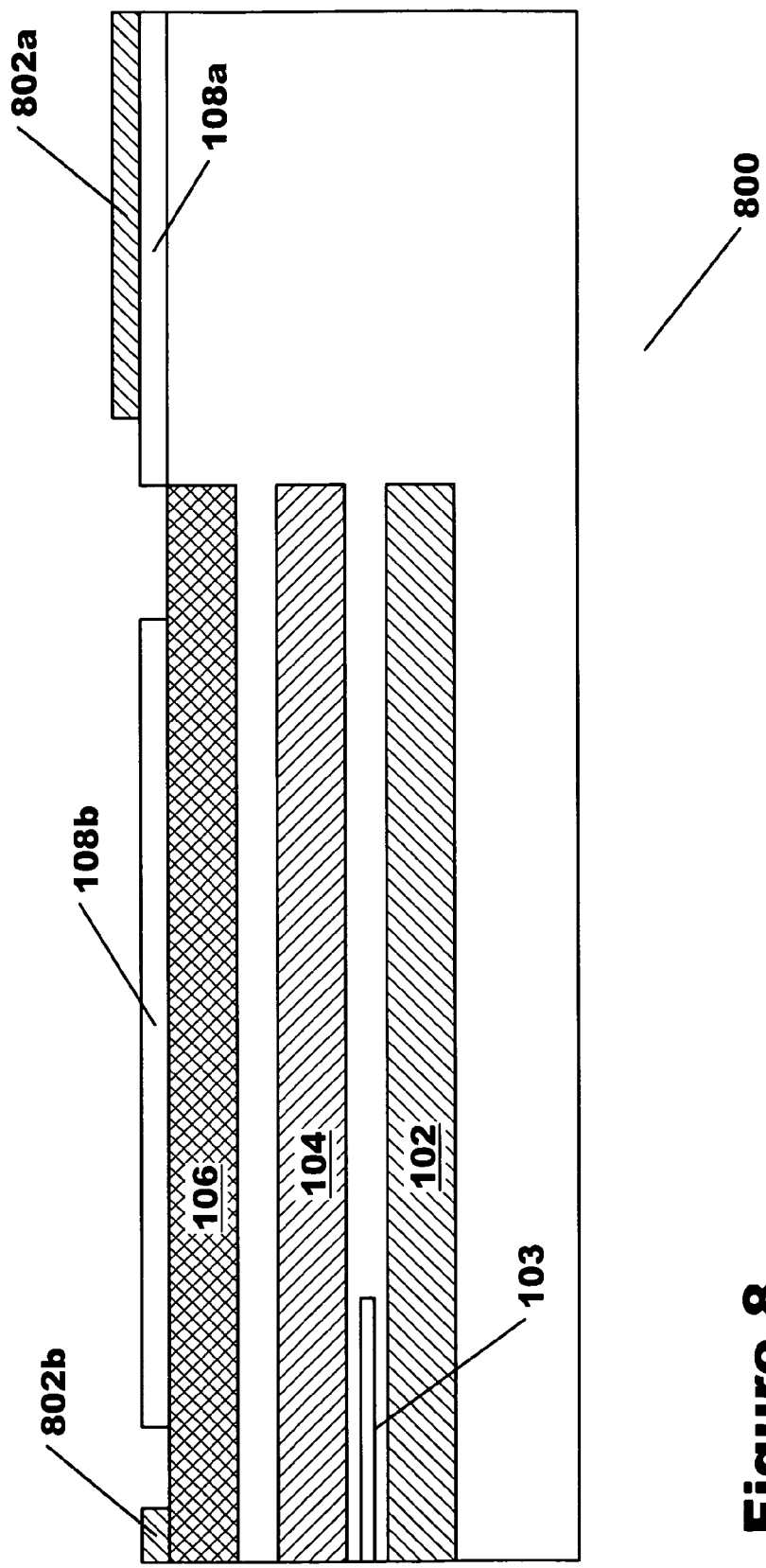
FIG. 8 is a partial cross section view of a thin film head structure subsequent to the deposition of a first seed layer 802a, b, in accordance with an embodiment of the present invention.

FIG. 8 is a partial cross section view 800 of a thin film head structure subsequent to the deposition of a first seed layer 802a, b, in accordance with an embodiment of the present invention. Prior to deposition of first seed layer 802, a photo resist layer is deposited, imaged, and developed (not shown). First seed layer is blanket deposited over the developed photo resist layer (not shown), and subsequent removal of the photo resist (not shown) leaves selected portions (802a, 802b) of first seed layer 802 remaining on the thin film head structure. In particular, first seed layer 802 is absent in the areas where the coil structure, pedestal, and backgap are to be deposited. However, it is essential that a portion 802a of the first seed layer make electrical contact with lower return pole layer 106. First seed layer 802 may be composed of conventional materials well known to those skilled in the art. The thickness of the first seed layer 802 needs to be sufficient to provide a low conductivity path from peripheral contact locations provide to make connection to the plating power sources. Typically, first seed layer 802 would be greater than about 200 angstroms, and preferably be between 500 and 1000 angstroms.

Figure 9:
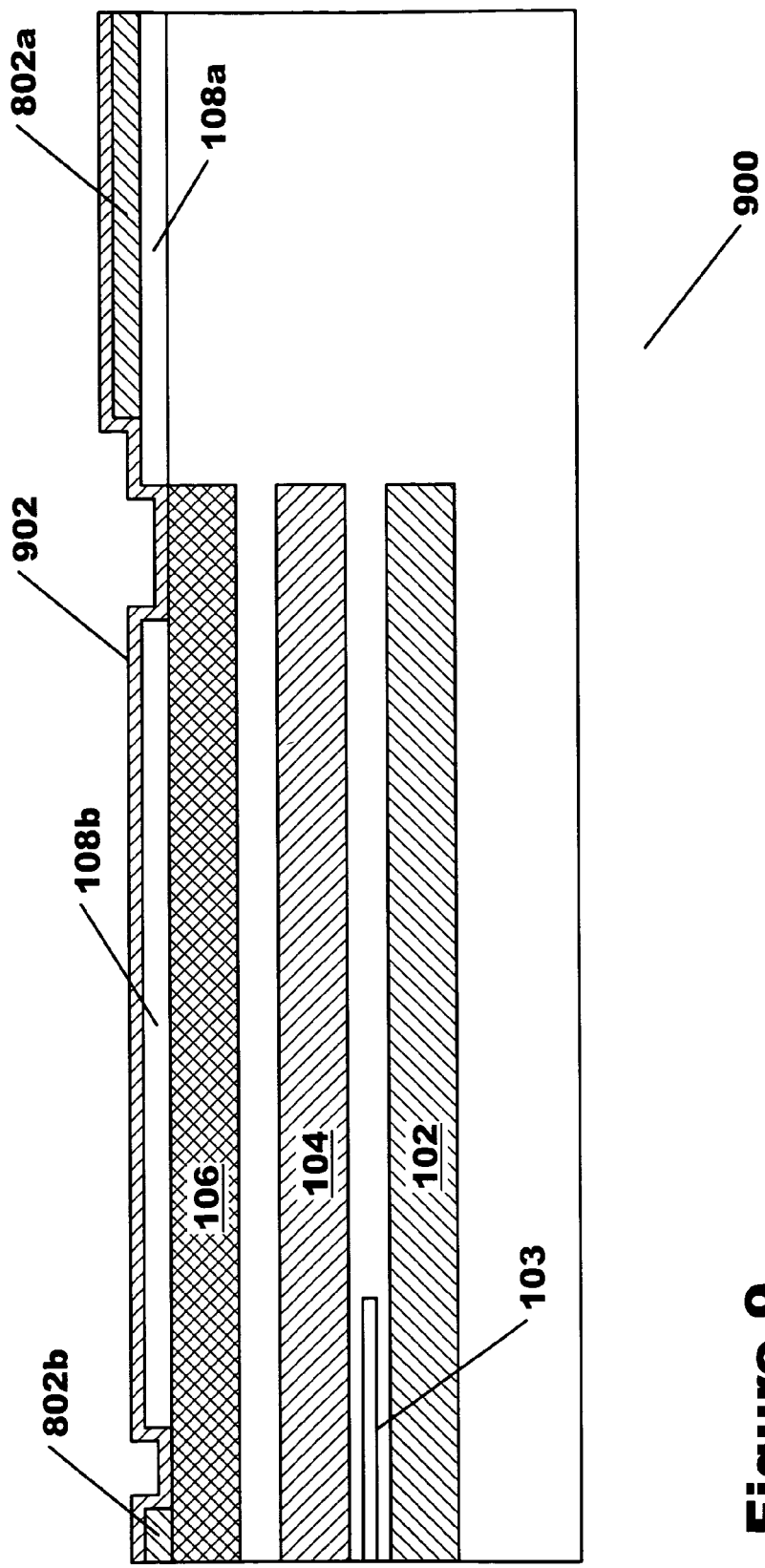
FIG. 9 is a partial cross section view of the structure of FIG. 8 subsequent to the deposition of second seed layer 902, in accordance with an embodiment of the present invention.

FIG. 9 is a partial cross section view 900 of the structure of FIG. 8 subsequent to the deposition of ultra-thin second seed layer 902, in accordance with an embodiment of the present invention. The ultra thin second seed layer 902 (also referred to a capping layer), is deposited over the exposed portions 802a, 802b of first seed layer 802, providing an electrical continuity between first seed layer 802 and ultra-thin second seed layer 902. Ultra thin seed layers cannot be utilized to provide low conductivity paths from the plating power source connections at the wafer (or chip) periphery, but have sufficient conductivity to plate localized coil structures when coupled with a thicker seed "bus" structure such as seed layer 802. Ultra thin second seed layer 902 may be comprised of a single layer, or multiple layers. The thickness and composition of ultra-thin second seed layer 902 may be determined, in part, by the etching process utilized to remove the ultra-thin seed layer subsequent to coil fabrication (see below). Line of sight etching processes like ion milling or sputter etching are less desirable due to the shadowing effect of high aspect ratio coil geometries, however these processes can still be utilized if the seed layer is thin enough. Etching processes such as RIE or wet etching are more desirable due to the isotropic nature of the etching, which provides better removal of seed layers at the bottom of high aspect ratio trench structures. Thin seed layers are also desirable for these processes to reduce etch times. For example, if a wet etching process is desirable, ultra thin second seed layer 902 may be copper, alloys of copper, chromium, and alloys of chromium, having a thickness between 10 and 20 angstroms. Other wet etchable metals may also be utilized, as would be recognized by those skilled in the art. If an RIE etch process is desired, then ultra-thin second seed layer 902 may be comprised one or two layers. A two layer structure contains a lower base layer of Ta or $Ta_2O_5$, and an upper layer of Rh. The lower base layer has a thickness between 10 and 50 angstroms, preferably between 10 and 20 angstroms. The upper layer has a thickness between 10 and 20 angstroms. A single layer structure comprises Ti or RIE etchable alloys of Ti, having a thickness between 10 and 50 angstroms, preferably between 10 and 20 angstroms. For ion milling or sputter etching, any of the above mentioned materials can be used, within the thickness ranges cited. Additionally, other conductive materials can be used as are known by those skilled in the art, provided they are sufficiently conductive for coil plating at a 10 to 50 angstrom thickness and have good adhesion to the first seed layer 802.

Figure 10:
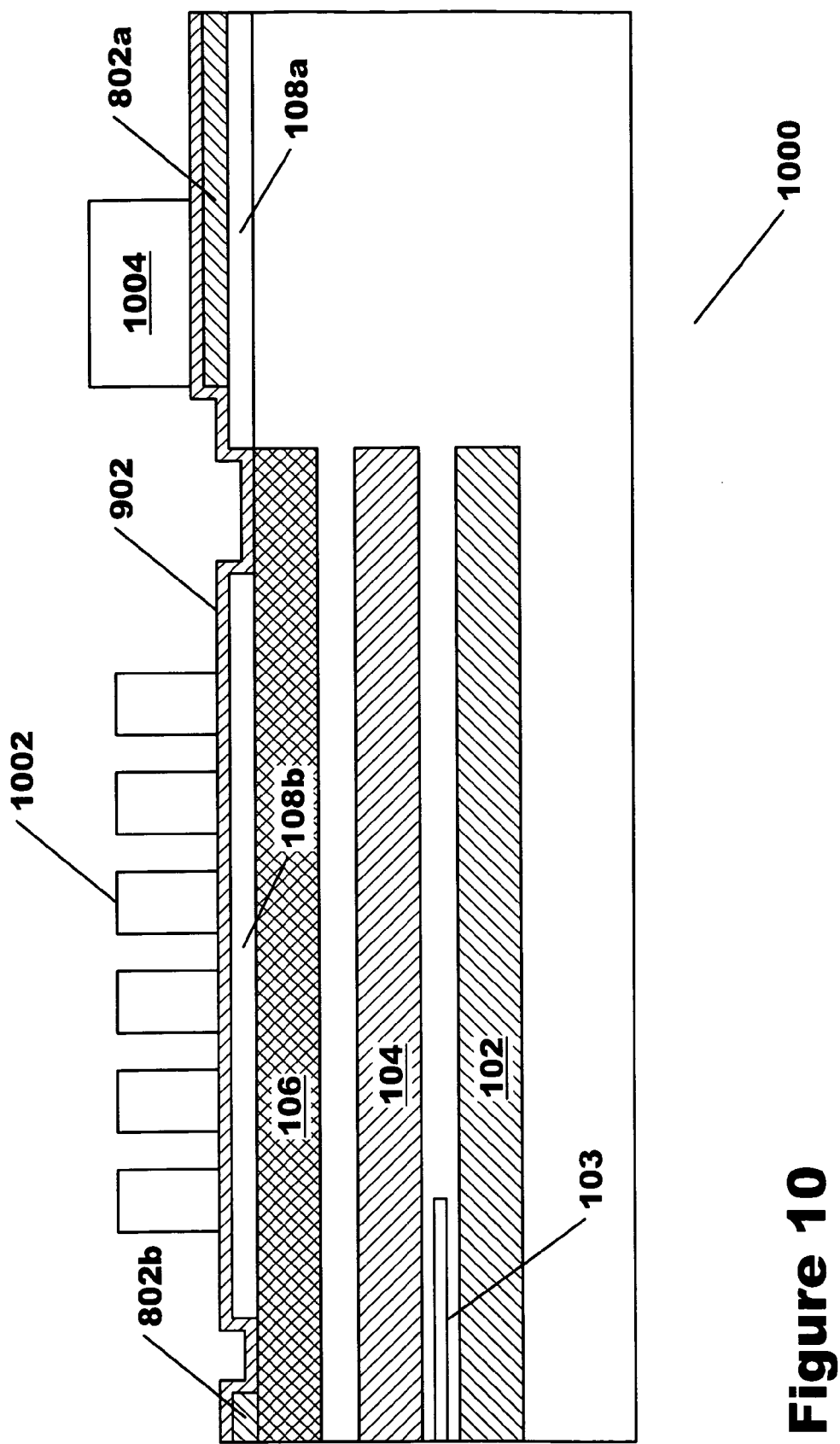
FIG. 10 is a partial cross section view of the structure of FIG. 9 subsequent to the fabrication of coil structure 1002 and center tap structure 1004, in accordance with an embodiment of the present invention.

FIG. 10 is a partial cross section view 1000 of the structure of FIG. 9 subsequent to the fabrication of coil structure 1002 and center tap structure 1004, in accordance with an embodiment of the present invention. Subsequent to deposition of ultra-thin second seed layer 902, a photo resist layer is deposited, imaged, and developed to define the coil structure 1002 and center tap structure 1004 (not shown). The coil structure 1002 and center tap structure 1004 are electroplated by electrical current conducted from first seed layer 802 to second seed layer 902 (not shown). Subsequent to electroplating, the photo resist layer is removed (not shown).

Figure 11:
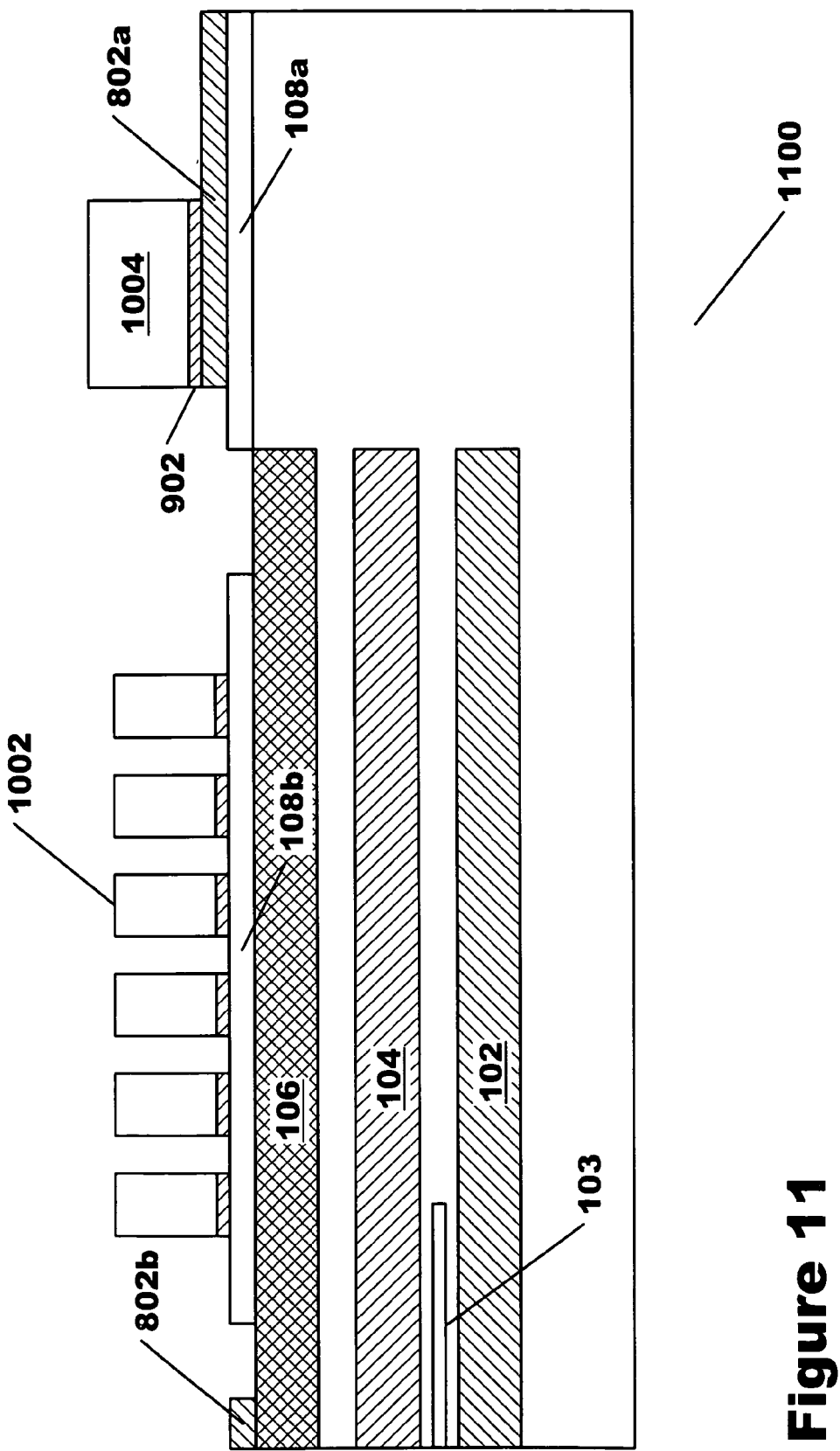
FIG. 11 is a partial cross section view of the structure of FIG. 10 subsequent to removal of exposed portions of second seed layer 902, in accordance with an embodiment of the present invention.

FIG. 11 is a partial cross section view 1100 of the structure of FIG. 10 subsequent to removal of exposed portions of second seed layer 902, in accordance with an embodiment of the present invention. In this step, exposed portions of ultra-thin second seed layer 902 are removed by RIE, wet etching, sputter etching, or ion milling, depending on the composition and structure of the second seed layer 902 as discussed above. These etch processes are designed to remove the ultra-thin second seed layer 902 without removing significant portions of the first seed layer 802, which is an important aspect of the present invention. Subsequent to removal of the second seed layer 902, the first seed layer 802 remains, allowing plating of pole and backgap structures without blanket deposition of another seed layer on coil structure 1002. Not only does this aspect of the present invention eliminate a number of process steps, but it removes the requirement to remove a seed layer between coil windings.

Figure 12:
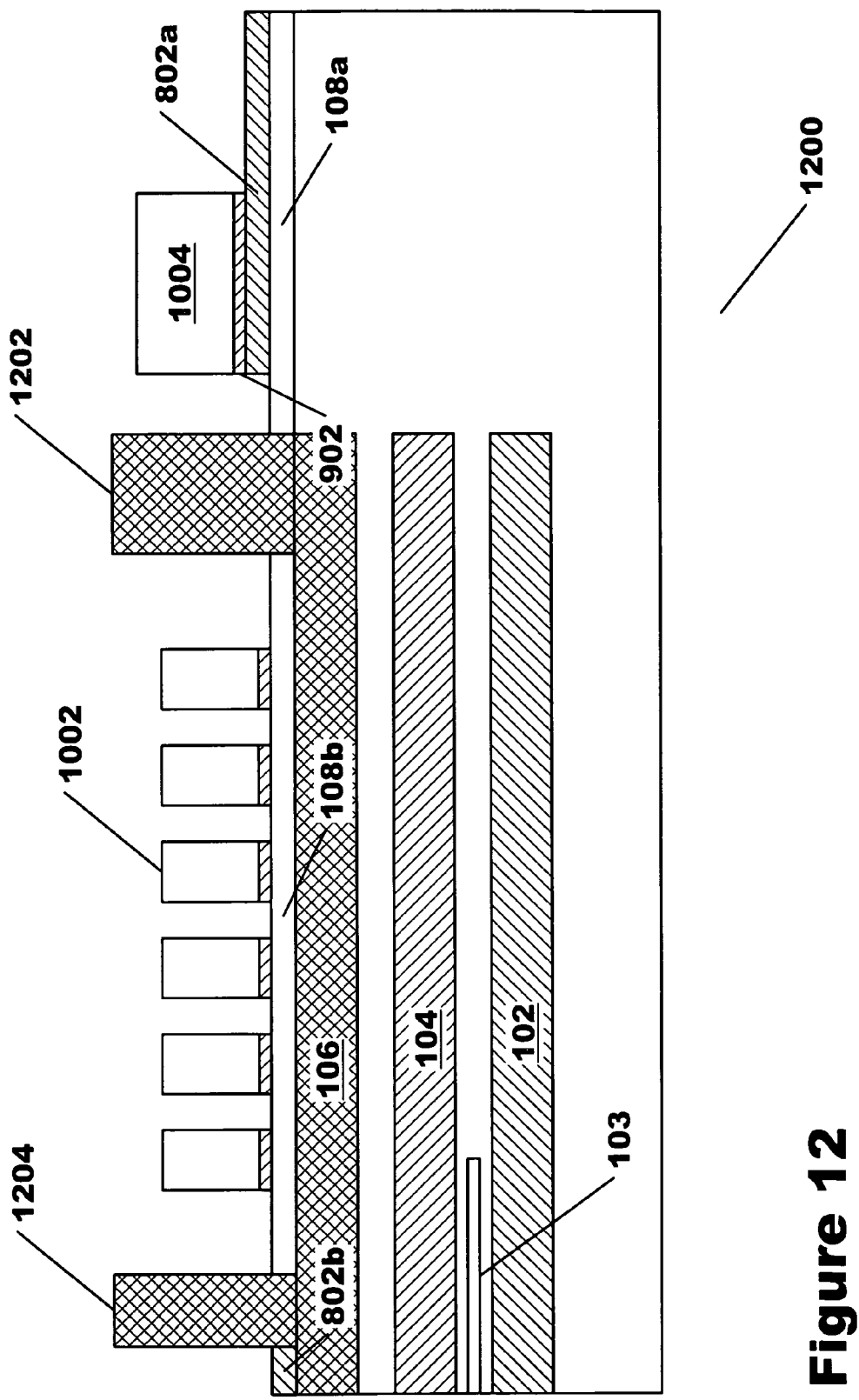
FIG. 12 is a partial cross section view of the structure of FIG. 11 subsequent to deposition of lower pole pedestal structure 1204 and backgap structure 1202, in accordance with an embodiment of the present invention; and, FIG. 13 is a partial cross section view of the structure of FIG. 12 subsequent to ion milling to remove remaining exposed portions of first seed layer 802a, b, in accordance with an embodiment of the present invention.

FIG. 12 is a partial cross section view 1200 of the structure of FIG. 11 subsequent to deposition of lower pole pedestal structure 1204 and backgap structure 1202, in accordance with an embodiment of the present invention. Prior to the formation of structures 1202 and 1204, a photo resist layer is deposited, imaged, and developed to define the lower pole pedestal 1204 and backgap 1202 (not shown). Lower pole pedestal 1204 structure is electroplated by electrical current flowing from first seed layer portion 802a, through a portion of lower return pole 106 (not shown). Backgap structure 1202 is electroplated by current flowing from first seed layer portion 802a through return pole layer 106 (not shown). Subsequent to electroplating, the photo resist layer is removed (not shown).

Figure 13:
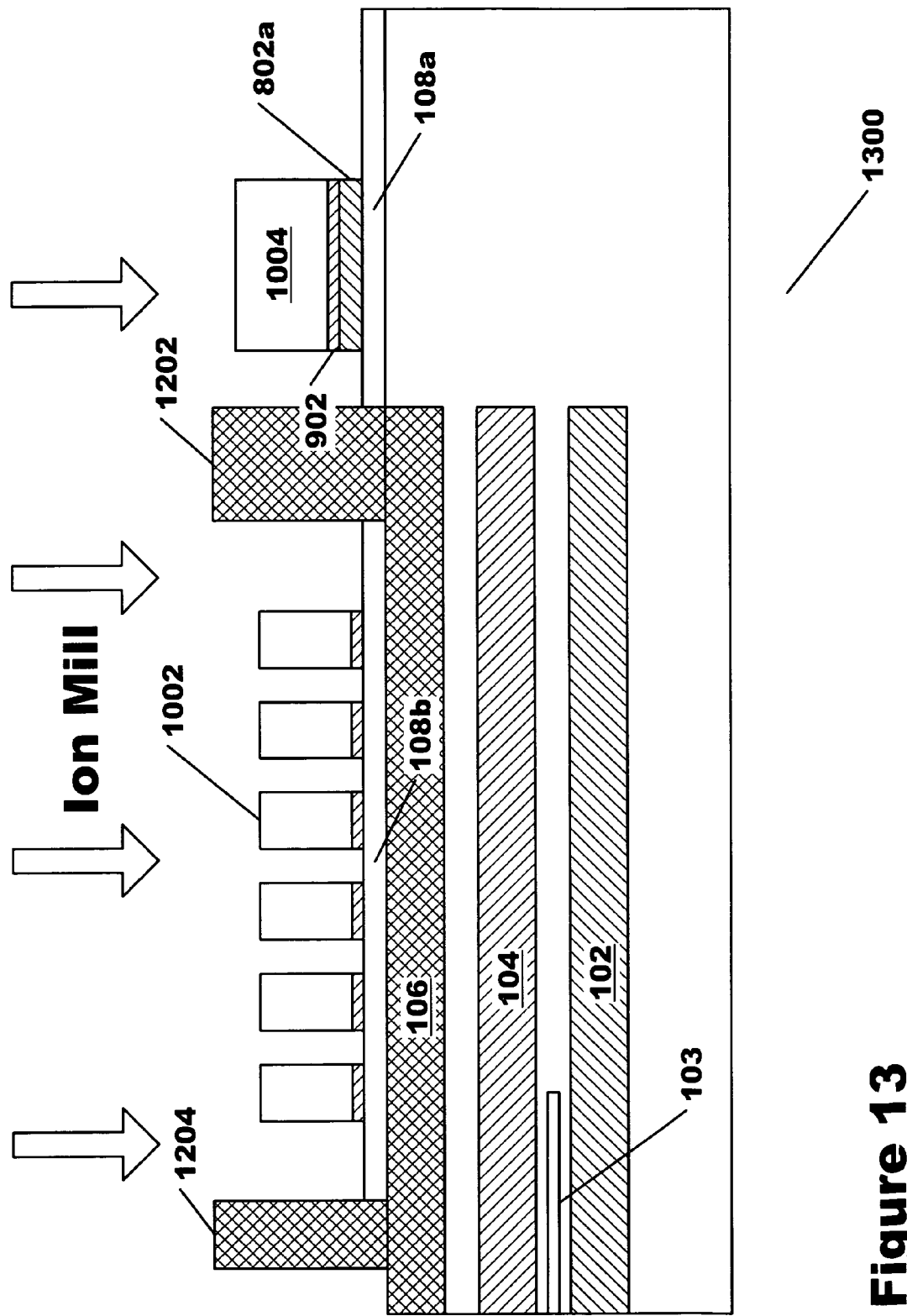

FIG. 13 is a partial cross section view 1300 of the structure of FIG. 12 subsequent to ion milling to remove remaining exposed portions of first seed layer 802a, b, in accordance with an embodiment of the present invention. First seed layer 802 is removed by conventional ion milling or sputter etch processes. Subsequent processes required to complete construction of the thin film magnetic head are well known to those skilled in the art, and need not be detailed further.

The foregoing embodiments disclose processes applicable to generic thin film write heads. It will be recognized by those of ordinary skill in the art, that such processes are equally applicable to thin film longitudinal write heads, and perpendicular thin film heads having shield structures, with minor modification.

The present invention is not limited by the previous embodiments heretofore described. Rather, the scope of the present invention is to be defined by these descriptions taken together with the attached claims and their equivalents.

What is claimed is:

1. A method for fabricating a thin film magnetic head comprising:
    depositing a first seed layer on a surface of a partially completed thin film head structure;
    removing a first portion of said first seed layer, exposing a portion of said surface;
    depositing a first portion of a second seed layer over a second portion of said first seed layer and a second portion of said second seed layer over said portion of said surface;
    depositing a photo resist layer over said second portion of said second seed layer;
    removing a portion of said photo resist layer;
    electroplating a coil structure over said second portion of said second seed layer by conducting electrical current from said second portion of said first seed layer to said second portion of said second seed layer, wherein said first seed layer is greater than 200 angstroms in thickness and said second seed layer is less than 70 angstroms in thickness;
    removing remaining portions of said photo resist layer subsequent to electroplating said coil structure;
    removing exposed portions of said second seed layer subsequent to removing said remaining portions of said photo resist layer; and,
    electroplating a lower pole pedestal structure and a backgap structure on a lower return pole layer subsequent to removing said exposed portions of said second seed layer, by conducting electrical current from a remaining portion of said first seed layer to said lower return pole layer.

2. The method as recited in claim 1, wherein said second seed layer comprises copper having a thickness between 10 and 20 angstroms.

3. The method as recited in claim 2, wherein said exposed portions of said second seed layer are removed by wet etching.

4. The method as recited in claim 1, wherein said second seed layer comprises chromium having a thickness between 10 and 20 angstroms.

5. The method as recited in claim 4, wherein said exposed portions of said second seed layer are removed by wet etching.

6. The method as recited in claim 1, wherein said second seed layer comprises a first layer and a second layer, said first layer comprising tantalum having a thickness between 10 and 50 angstroms, said second layer comprising rhodium having a thickness between 10 and 20 angstroms.

7. The method as recited in claim 6, wherein said exposed portions of said second seed layer are removed by RIE.

8. The method as recited in claim 1, wherein said second seed layer comprises titanium having a thickness between 10 and 50 angstroms.

9. The method as recited in claim 8, wherein said exposed portions of said second seed layer are removed by RIE.

10. The method as recited in claim 9, wherein said second seed layer comprises titanium having a thickness between 10 and 20 angstroms.

11. The method as recited in claim 1, wherein said exposed portions of said second seed layer are removed by ion milling.

12. The method as recited in claim 1, wherein said exposed portions of said second seed layer are removed by sputter etching.

* * * * *